United States Patent [19]

Neuman

[11] 4,419,066

[45] Dec. 6, 1983

[54] MACHINE FOR CONTINUOUSLY DENSIFYING LIGNO-CELLULOSIC OR LIKE MATERIALS

[75] Inventor: Marcel Neuman, Embourg, Belgium

[73] Assignee: Biomass Development S.A., Zurich, Switzerland

[21] Appl. No.: 315,442

[22] Filed: Oct. 27, 1981

[30] Foreign Application Priority Data

Oct. 28, 1980 [FR] France .............................. 80 23419

[51] Int. Cl.³ ............................................ A01J 21/00

[52] U.S. Cl. ................................................ 425/371

[58] Field of Search ........................................ 425/371

[56] References Cited

U.S. PATENT DOCUMENTS 3,157,551 11/1964 Granozio ........................... 425/371

3,781,154 12/1973 Herbert et al. ........................ 425/371

4.005,970 2/1977 Leloux ................................ 425/371

4,128,373 12/1978 Greten ................................ 425/371

*Primary Examiner*—James R. Hall

*Attorney, Agent, or Firm*—Dowell & Dowell

[57] ABSTRACT

The invention relates to an improved machine for continuously compacting ligno-cellulosic or like materials, comprising two toothed conveyor belts mounted around drums, the teeth and valleys of these belts being located outside so that their stretched sides cooperate to compress a fibrous or like materials poured between these belts via a hopper. Compression rollers facilitate compression and cooperate with the resilient toothed belts to cause a pulsating effect of the belts on the materials. The invention is more particularly applicable to compacting ligno-cellulosic or like materials.

4 Claims, 3 Drawing Figures

MACHINE FOR CONTINUOUSLY DENSIFYING LIGNO-CELLULOSIC OR LIKE MATERIALS

The present invention relates to improvements in machines for continuously compacting ligno-cellulosic materials such as wood waste, wood shavings, sawdust, straw, etc.

Machines are known for extruding materials of the type in question such as those mentioned above for making high density sticks or logs which are then burnt in the same way as charcoal. Known machines of this type are generally constructed with a view to treating a certain category of waste, but they have proved absolutely unsuitable for making sticks from other similar materials.

The reason why the machines in question were not universally usable was then sought, and it was soon realised that the considerable differences in apparent specific weight existing between diverse ligno-cellulosic materials encountered are the main cause of the poor functioning of said machines. As a result it will be readily appreciated that the greatly diversified use of materials for the manufacture of sticks as fuel cannot be envisaged.

With a view to rendering stick extruders operative for use on a larger variety of materials, an intermediate machine according to the invention is used to pre-compact materials at the entrance thereof, the pre-compacting machine being adapted to form small wafers or plaques of materials of virtually constant density whatever the origin of the materials used.

According to the invention, a machine is provided to subject the materials which are to be treated to a continuous compaction which, in addition to compressing the materials, eliminates, at least partially, the air included between the particles of treated material. The stick extruder being fed with the output of this machine receives a product of substantially constant specific weight, so that it may be successfully used virtually whatever may be the material, for example sawdust, crushed walnut shells, seeds, straw, paper, bark, vegetable hulls, etc.

The compacting machine according to the invention comprises two parallel conveyors with vertically oriented toothed belts each of which is mounted around a pair of drums and between which the material to be treated passes, said toothed belts intermeshing with each other and being compressed by rollers placed on both sides of said belts along the path of said materials.

In addition to the effect of compression to which the material is subjected, on the one hand at the drums over which the belts are stretched, and on the other hand at the compression rollers, said material is subjected to a pulsating effect between said belts due to the relative elasticity of the toothed belts which are deformed between the rollers. The pulsating effect in question provides for the escape of the included air. The material leaving the intermediate machine according to the invention thus has the qualities required for satisfactorily supplying the known stick extruders.

Due to the presence of the teeth and valleys on the opposite faces of the belts, it is not a continuous product which is automatically obtained at the outlet of the machine according to the invention, but a plurality of small wafers or plaques which are particularly well adapted to the use envisaged.

The invention will be more readily understood on reading the following description with reference to the accompanying drawings, in which.

Figure 1:
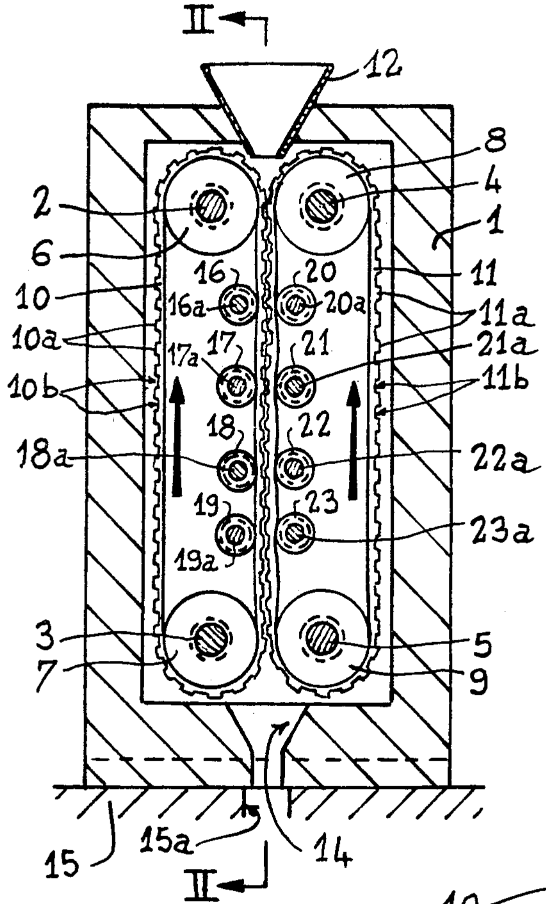
FIG. 1 is a vertical section through a compacting machine according to the invention.

Referring now to the drawings, FIG. 1 very schematically shows a machine according to the invention which essentially comprises a frame 1 supporting four shafts 2 to 5 by means of bearings. Each of the shafts is provided with a drum 6, 7, 8 and 9, respectively. Toothed belts 10, 11 are vertically stretched between drums 6 and 7 and drums 8 and 9 respectively, the teeth of these belts being oriented outwardly for reasons which will be set forth hereinafter. The two belts 10 and 11 are identical and they are arranged with respect to drums 6 and 8 by any suitable means so that the teeth of one belt mesh exactly with the valleys of the other, as will be explained hereinafter with reference to FIG. 3.

It will be observed that the upper part of the frame 1 is provided with a hopper 12 of which the lower opening is located between the two drums 6 and 8 so that any material placed in this hopper flows between the two belts 10 and 11.

The two shafts 3 and 5 may be connected by gears so that they rotate at the same speed but in opposite directions by means of an electric motor 13.

To simplify assembly, as the teeth of the belts 10 and 11 penetrate into the valleys of the other belts exactly, it is necessary to drive only one shaft, for example shaft 3, to cause synchronised displacement of the two belts.

An outlet 14 is provided in the base of the frame 1 through which the compact product leaves to enter for example a storage tank 15 via its inlet 15. The tank 15 may of course constitute a storage hopper for supplying a stick extruder.

The frame 1 further rotatably supports shafts 16 to 19 and 20 to 23 of compression rollers 16 to 23 which abut against the inner untoothed faces of the stretched sides of the two belts 10 and 11.

Figure 3:
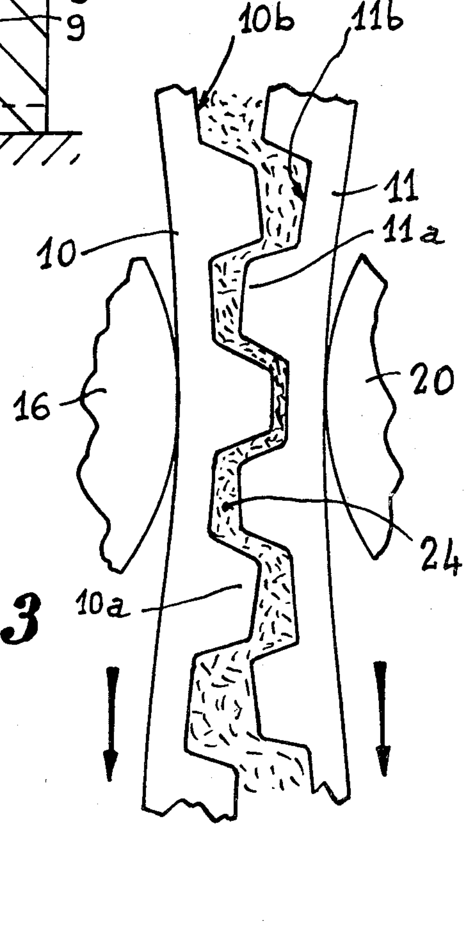
FIG. 3 is a view in detail, to a larger scale, illustrating the action of the compression rollers on the two toothed belts.
Figure 2:
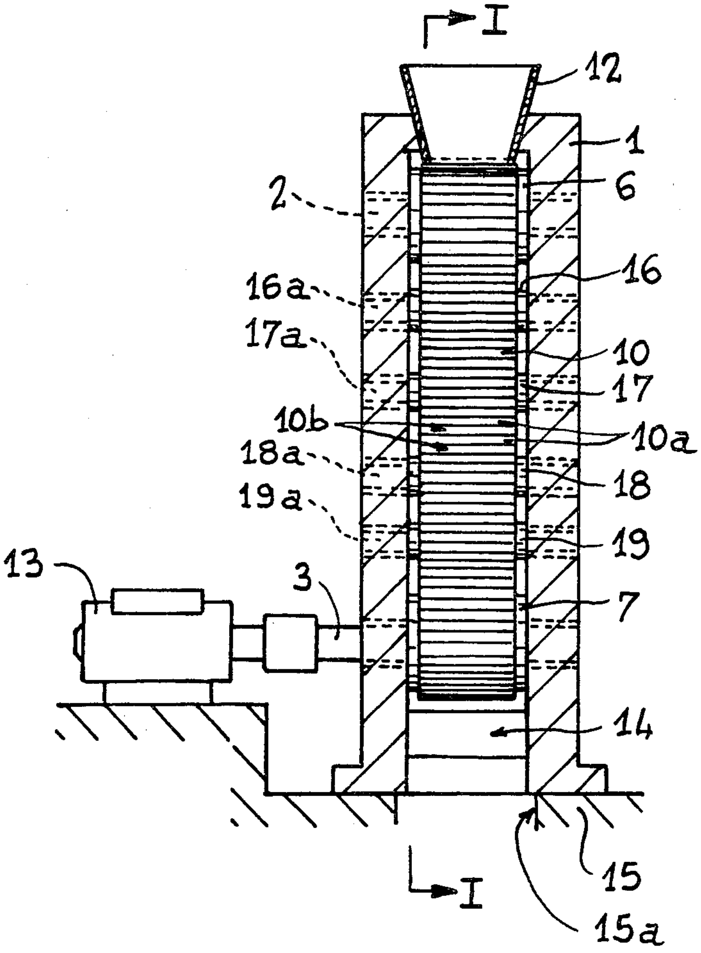
FIG. 2 is a transverse section along II—II (FIG. 1). The plane of section of FIG. 1 is shown therein at I—I.

FIG. 3 shows on a larger scale the passage of the belts 10 and 11 at the level of two compression rollers, for example 16 and 20. This Figure clearly shows the shape of each belt whose outer face presents successive teeth 10, 11 separated by valleys 10, 11, the whole constituting a kind of wide-toothed double rack.

As the distance between the rollers 16 and 20 is less than the total thickness of the two belts and the material 24 poured through hopper 12, the material is compressed at the level of the paired rollers so that the density thereof increases. Of course, the distance between the drums 6 and 8 is adjustable so that the matter 24 is easily introduced, this distance normally being greater than that between rollers 16 and 20. This is why FIG. 3 shows the two belts 10 and 11 oblique with respect to one another and converging downwardly as far as the level of the rollers 16 and 20. Of course, due to the elasticity of the belts 10 and 11, which are generally made of an elastomer, the volume of the material increases after passing the rollers 16 and 20. It is then subjected to further compression at the following rollers 17 and 21, and so on until it passes between the lower drums 7 and 9 driving the two belts. As has been explained hereinabove, the material is therefore subjected to an effect of pulsation due to the elasticity of the belts, in addition to the effect of compression exerted by the drums and the rollers, so that virtually all the included air escapes during transfer of the material along the machine according to the invention. The design of the machine according to the invention enables compaction to be obtained by continuous, successive actions of compression and expansion, which, because of the pulsating action, gives a better result than by simple compression. In fact, the process according to the invention may be compared with a hammering.

A machine has therefore been made, simply and economically, which can produce small wafers or plaques of ligno-cellulosic or like material which can satisfactorily be supplied to machines for making sticks of compressed material, such as described in U.S. Pat. No. 3,904,340.

The preceding description has been given only by way of non-limiting example and equivalent modifications may be made without departing from the scope of the invention.

What is claimed is:

1. A machine for continuously compacting ligno-cellulosic materials, comprising:

(a) a frame having an inlet at one end and an outlet at the other end;

(b) a pair of mutually spaced parallel shafts supported in the frame near its inlet, and a pair of mutually spaced parallel shafts supported in the frame near its outlet;

(c) two pairs of drums respectively carried by the paired shafts within the frame, and means to drive at least one of said drums;

(d) two elastomeric toothed belts, each respectively carried by two drums comprising one of the drums at each end of the frame, the belts having inner surfaces engaging the drums and having opposed outer toothed surfaces with the teeth of each belt meshed in the valleys of the opposed belt to synchronize travel of the belts;

(e) multiple pairs of opposed compression rollers journaled to rotate about their axes in the frame, and being disposed in sequentially adjacent pairs of rollers which are spaced along the belts, and the rollers in each pair being disposed to contact the inner surfaces of the belts respectively on opposite sides of their opposed and meshed toothed surfaces;

(f) means for introducing said materials between the belts and drums at said inlet end, whereby the materials travel between said toothed and meshed belt surfaces and are discharged therefrom at said outlet end; and (g) the compression rollers of each pair being operatively located to compress the elastomeric belts and compact the materials passing between them, and adjacent pairs of rollers being spaced apart to leave uncompressed intervals of belt travel therebetween, whereby alternate pulsating compression and expansion of the belts and materials occurs successively as the belts travel between the pairs of rollers and through the intervals therebetween.

2. The machine as claimed in claim 1, wherein the drums near the inlet end of the frame spaced by a mutual separation permitting introduction of the materials between the belts, and said separation is greater than the separation between the compression rollers of each pair.

3. The machine as claimed in claim 1, wherein the compression rollers of each pair are located to provide a mutual separation which successively diminishes from pair to pair as the meshing surfaces of the belts approache the outlet of the frame.

4. The machine as claimed in claim 1, wherein the separation between the pair of shafts near said inlet end of the frame is adjustable.

* * * * *